(12) United States Patent
Sugimoto et al.

(10) Patent No.: US 8,690,304 B2
(45) Date of Patent: Apr. 8, 2014

(54) TREATMENT SOLUTION FOR INK-JET RECORDING, WATER-BASED INK SET FOR INK-JET RECORDING, INK-JET RECORDING METHOD, AND INK-JET RECORDING APPARATUS

(75) Inventors: Junichiro Sugimoto, Nagoya (JP); Ryuji Kato, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 154 days.

(21) Appl. No.: 13/228,825

(22) Filed: Sep. 9, 2011

(65) Prior Publication Data
US 2012/0081459 A1    Apr. 5, 2012

(30) Foreign Application Priority Data
Sep. 30, 2010  (JP) ................. 2010-223246
Jul. 11, 2011  (JP) ................. 2011-152644

(51) Int. Cl.
*B41J 2/01* (2006.01)
*B41J 2/21* (2006.01)
*B41J 11/00* (2006.01)

(52) U.S. Cl.
CPC  *B41J 2/2114* (2013.01); *B41J 2/21* (2013.01); *B41J 2/2107* (2013.01); *B41J 11/0015* (2013.01)
USPC ................. 347/96; 347/95; 347/100

(58) Field of Classification Search
CPC ........... B41J 2/114; B41J 2/01; B41J 2/21; B41J 2/107; B41J 2/103
USPC ................ 347/21, 28, 95–100; 523/160, 161; 106/31.13, 31.6
See application file for complete search history.

(56) References Cited

U.S. PATENT DOCUMENTS 5,609,671 A  3/1997 Nagasawa
5,837,045 A  11/1998 Johnson et al.
(Continued)

FOREIGN PATENT DOCUMENTS

EP  1 243 435 A1  9/2002
JP  64-069381  3/1989
(Continued)

OTHER PUBLICATIONS

European Search Report dated Nov. 17, 2011, corresponding Application No. 11180604.8.

*Primary Examiner* — Matthew Luu
*Assistant Examiner* — Rut Patel
(74) *Attorney, Agent, or Firm* — Banner & Witcoff, Ltd.

(57) ABSTRACT

A treatment solution used for ink-jet recording, includes a quaternary alkylammonium salt represented by general formula (1) and water:

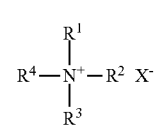

(1)

wherein $R^1$ to $R^3$ are alkyl groups each having 1 to 3 carbon atoms, and are identical with each other or different from each other;

$R^4$ is an alkyl group having 8 to 16 carbon atoms;

each of the alkyl groups of $R^1$ to $R^4$ is a substituted alkyl group or an unsubstituted alkyl group, and has a straight chain or a branched chain; and $X^-$ is one of inorganic acid ion, organic acid ion, and hydroxide ion.

15 Claims, 3 Drawing Sheets

(56) References Cited

U.S. PATENT DOCUMENTS

| | | |
|---|---|---|
| 6,488,867 B1 | 12/2002 | Matsumoto et al. |
| 2004/0070655 A1* | 4/2004 | Aoi et al. .................. 347/100 |
| 2005/0155516 A1 | 7/2005 | Hermansky |
| 2006/0201380 A1 | 9/2006 | Kowalski et al. |
| 2007/0052783 A1* | 3/2007 | Taguchi et al. ............ 347/100 |
| 2007/0100023 A1 | 5/2007 | Burns et al. |
| 2007/0100024 A1 | 5/2007 | Gu et al. |
| 2007/0188571 A1* | 8/2007 | Tokita et al. .............. 347/100 |
| 2008/0241398 A1 | 10/2008 | Kato et al. |

FOREIGN PATENT DOCUMENTS

| | | |
|---|---|---|
| JP | 08-003498 | 1/1996 |
| JP | 11-314449 | 11/1999 |
| JP | 2000-513396 | 10/2000 |
| JP | 2008-524400 | 7/2008 |
| JP | 2008-246821 | 10/2008 |
| JP | 2009-515007 | 4/2009 |

* cited by examiner

TREATMENT SOLUTION FOR INK-JET RECORDING, WATER-BASED INK SET FOR INK-JET RECORDING, INK-JET RECORDING METHOD, AND INK-JET RECORDING APPARATUS

CROSS REFERENCE TO RELATED APPLICATION

The present application claims priority from Japanese Patent Applications No. 2010-223246 filed on Sep. 30, 2010 and No. 2011-152644 filed on Jul. 11, 2011, the disclosure of which is incorporated herein by reference in its entirety.

BACKGROUND OF THE INVENTION

1. Field of the Invention

The present invention relates to a treatment solution for ink-jet recording, a water-based ink set for ink-jet recording, an ink-jet recording method, and an ink-jet recording apparatus.

2. Description of the Related Art

The ink-jet recording is carried out in some cases by using a treatment solution (process liquid) blended with polyallylamine (PAA) in order to improve the optical density (OD value) of a recorded image recorded with a water-based ink based on the use of a pigment ink (see, for example, Japanese Patent Application Laid-open No. 11-314449). PAA, which is contained in the treatment solution as described above, can aggregate the pigment contained in the water-based ink on the recording medium. As a result, the optical density (OD value) of the recorded image is improved.

However, if the treatment solution, which contains PAA, is thawed, for example, after the treatment solution is frozen during the use in a cold district or during the transportation by an airplane or the like, the treatment solution causes the phase separation. Further, if the treatment solution is exposed to a high temperature environment, for example, during the transportation or the storage in a warehouse in summer, a color of the treatment solution is changed (the treatment solution undergoes color-change). Thus, the treatment solution, which contains PAA, involves such a problem that the storage stability is insufficient in the low temperature environment and the high temperature environment.

SUMMARY OF THE INVENTION

In view of the above, an object of the present teaching is to provide a treatment solution for ink-jet recording which makes it possible to improve the optical density (OD value) of a recorded image and which is excellent in the storage stability as well.

According to a first aspect, there is provided a treatment solution used for ink-jet recording, including a quaternary alkylammonium salt represented by general formula (1) and water:

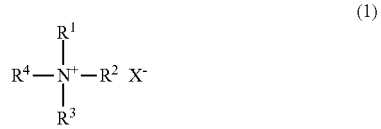

(1)

wherein $R^1$ to $R^3$ are alkyl groups each having 1 to 3 carbon atoms, and are identical with each other or different from each other;

$R^4$ is an alkyl group having 8 to 16 carbon atoms;

each of the alkyl groups of $R^1$ to $R^4$ is a substituted alkyl group or an unsubstituted alkyl group, and has a straight chain or a branched chain; and $X^-$ is one of inorganic acid ion, organic acid ion, and hydroxide ion.

According to a second aspect, there is provided a water-based ink set for ink-jet recording including: a water-based ink for ink-jet recording which contains a pigment, water, and a water-soluble organic solvent; and the treatment solution of the first aspect.

According to a third aspect, there is provided an ink-jet recording method for performing recording on a recording medium, the method including: applying, to the recording medium, the treatment solution of the water-based ink set for ink-jet recording of the second aspect; and discharging, to the recording medium, the water-based ink of the water-based ink set for ink-jet recording.

According to a fourth aspect, there is provided an ink-jet recording apparatus including: an ink set accommodating section in which the water-based ink set for ink-jet recording of the second aspect is accommodated; a treatment solution applying mechanism which applies, to the recording medium, the treatment solution of the water-based ink set; and an ink discharge mechanism which discharges, to the recording medium, the water-based ink of the water-based ink set.

The treatment solution for ink-jet recording according to the present teaching makes it possible to improve the optical density (OD value) of the recorded image, and the treatment solution for ink-jet recording according to the present teaching is excellent in the storage stability as well.

DESCRIPTION OF THE PREFERRED EMBODIMENTS

Figure 1:
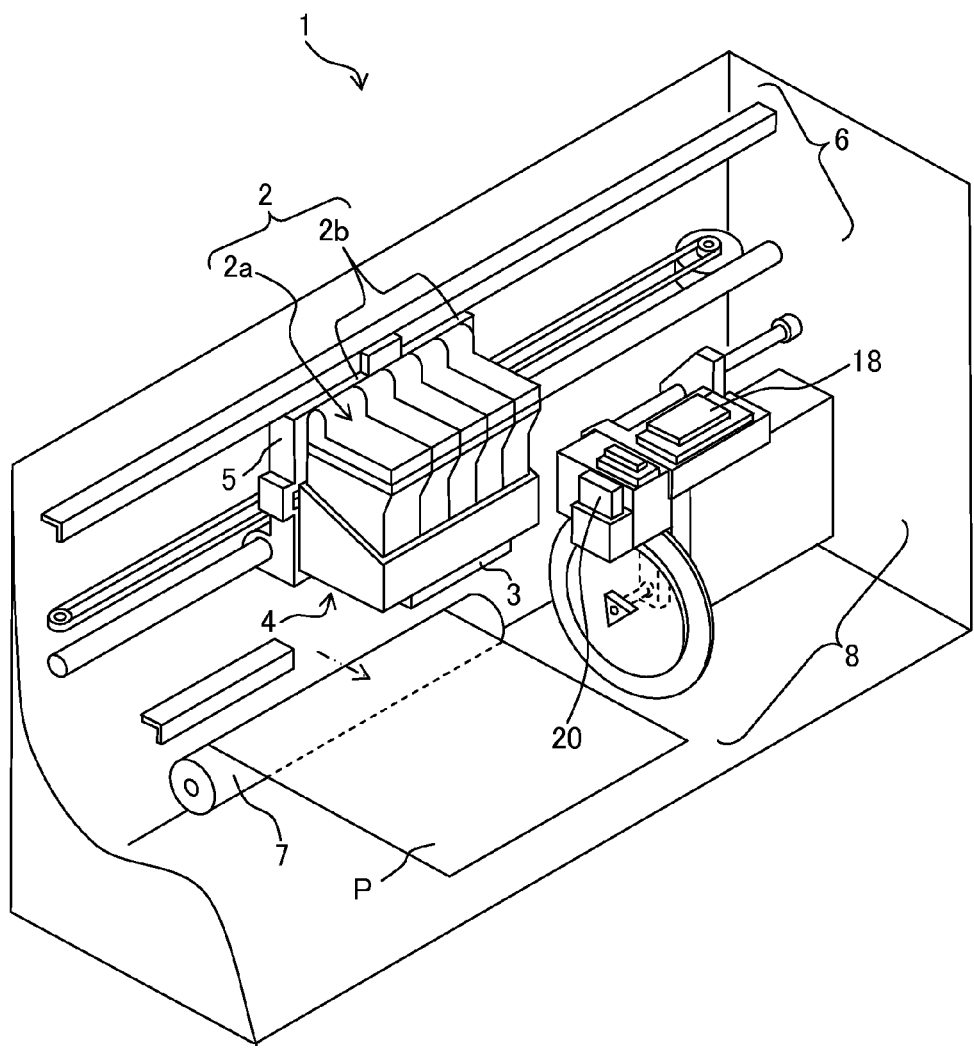
FIG. 1 shows a schematic perspective view illustrating an exemplary arrangement of an ink-jet recording apparatus according to the present teaching (a serial type ink-jet head is adopted).

As described above, the treatment solution (process liquid) of the present teaching is the treatment solution to be used for the ink-jet recording, which contains the quaternary alkylammonium salt represented by the general formula (1) and water. The treatment solution of the present teaching may contain other components other than the quaternary alkylammonium salt represented by the general formula (1) and water. The quaternary alkylammonium cation is produced from the quaternary alkylammonium salt represented by the general formula (1). Further, the quaternary alkylammonium cation has, for example, such a function that a pigment contained in a water-based ink, which is negatively charged, is aggregated when the treatment solution and the water-based ink are brought in contact with each other on a recording medium. Accordingly, it is possible to improve the optical density (OD value) of the recorded image. Further, the treatment solution of the present teaching does not cause the phase separation even when the treatment solution is thawed after the freezing, and the color of the treatment solution of the present teaching is not changed even when the treatment solution is in the high temperature environment, because the treatment solution of the present teaching contains the quaternary alkylammonium salt represented by the general formula (1).

In the general formula (1), $R^1$ to $R^3$ are alkyl groups each having a number of carbon atom or atoms of 1 to 3. The alkyl group having the number of carbon atom or atoms of 1 to 3 may have a straight chain or a branched chain, which is exemplified by methyl group, ethyl group, n-propyl group, and isopropyl group. The alkyl group having the number of carbon atom or atoms of 1 to 3 may have a substituent or substituents such as halogen atom or the like. In the general formula (1), each of $R^1$ to $R^3$ is preferably alkyl group having a number of carbon atom or atoms of 1 or 2, i.e., methyl group or ethyl group. The alkyl group having the number of carbon atom or atoms of 1 or 2 may have a substituent or substituents such as halogen atom or the like. In the general formula (1), $R^1$ to $R^3$ may be identical with each other or different from each other. In the quaternary alkylammonium salt represented by the general formula (1), when $R^1$ to $R^3$ are alkyl groups each having a number of carbon atom or atoms of 1 to 3 as short carbon chains, it is possible to obtain the high solubility in water.

In the general formula (1), $R^4$ is an alkyl group having a number of carbon atoms of 8 to 16. When the number of carbon atoms of $R^4$ is not less than 8, it is possible to improve the optical density (OD value) of the recorded image. Further, when the number of carbon atoms of $R^4$ is not more than 16, it is possible to avoid the phase separation after the freezing and the thawing of the treatment solution, and it is possible to obtain the treatment solution which is excellent in the storage stability. The alkyl group having the number of carbon atoms of 8 to 16 is exemplified, for example, by octyl group, nonyl group, lauryl group (dodecyl group), tetradecyl group, and hexadecyl group. The alkyl group having the number of carbon atoms of 8 to 16 may have a substituent or substituents such as halogen atom or the like, which may have a straight chain or a branched chain. In the general formula (1), $R^4$ is preferably an alkyl group having a number of carbon atoms of 8 to 12. The alkyl group having the number of carbon atoms of 8 to 12 may have a substituent or substituents such as halogen atom or the like, which may have a straight chain or a branched chain.

In the general formula (1), $X^-$ is an anion which is any one of inorganic acid ion, organic acid ion, and hydroxide ion. The inorganic acid ion and the organic acid ion are exemplified, for example, by methyl sulfate ion, ethyl sulfate ion, sulfate ion, nitrate ion, acetate ion, dicarboxylate (for example, malate and itaconate) ion, and tricarboxylate (for example, citrate) ion. When $X^-$ is the dicarboxylate ion or the tricarboxylate ion, the dicarboxylate ion or the tricarboxylate ion is a counter ion of two or three quaternary alkylammonium ions. The quaternary alkylammonium salt, in which $X^-$ is any one of the inorganic acid ion, the organic acid ion, and the hydroxide ion in the general formula (1), is available with ease, and the quaternary alkylammonium salt hardly corrodes the metal member which is brought in contact with the treatment solution in the ink-jet recording apparatus. On the other hand, it is feared that the halide ion may corrode the metal member which is brought in contact with the treatment solution in the ink-jet recording apparatus, and it is undesirable to use the halide ion as the anion $X^-$ of the general formula (1).

The quaternary alkylammonium salt represented by the general formula (1) may be prepared in a self-complete manner. Alternatively, any commercially available product may be used as the quaternary alkylammonium salt represented by the general formula (1). The commercially available product is exemplified, for example, by "Catiogen (trade name) ES-OW" and "Catiogen (trade name) ES-L" produced by Dai-ichi Kogyo Seiyaku Co., Ltd.

It is preferable that the blending amount (as converted into the active ingredient amount) of the quaternary alkylammonium salt represented by the general formula (1) is not less than 1% by weight with respect to the total amount of the treatment solution. When the blending amount (as converted into the active ingredient amount) is not less than 1% by weight, it is possible to further improve the optical density (OD value) of the recorded image. The blending amount (as converted into the active ingredient amount) is more preferably 1% by weight to 20% by weight, much more preferably 4% by weight to 15% by weight, and especially preferably 10% by weight to 15% by weight. The term "as converted into the active ingredient amount" means the amount of the quaternary alkylammonium salt itself represented by the general formula (1) except for water, for example, when an aqueous solution of the quaternary alkylammonium salt represented by the general formula (1) is used.

It is preferable that the water, which is used for the treatment solution, is ion exchange water or pure water. The blending amount of water with respect to the total amount of the treatment solution may be, for example, the balance of those of the other components.

The treatment solution may further contain a water-soluble organic solvent. Those having been hitherto known can be used as the water-soluble organic solvent. The water-soluble organic solvent is exemplified, for example, by polyhydric alcohol, polyhydric alcohol derivative, alcohol, amide, ketone, ketoalcohol (ketone alcohol), ether, nitrogen-containing solvent, sulfur-containing solvent, propylene carbonate, ethylene carbonate, and 1,3-dimethyl-2-imidazolidinone. The polyhydric alcohol is exemplified, for example, by glycerol, ethylene glycol, propylene glycol, butylene glycol, hexylene glycol, diethylene glycol, triethylene glycol, polyethylene glycol, dipropylene glycol, tripropylene glycol, polypropylene glycol, trimethylolpropane, 1,5-pentanediol, and 1,2,6-hexanetriol. The polyhydric alcohol derivative is exemplified, for example, by ethylene glycol methyl ether, ethylene glycol ethyl ether, ethylene glycol n-propyl ether, ethylene glycol n-butyl ether, diethylene glycol methyl ether, diethylene glycol ethyl ether, diethylene glycol n-propyl ether, diethylene glycol n-butyl ether, diethylene glycol n-hexyl ether, triethylene glycol methyl ether, triethylene glycol ethyl ether, triethylene glycol n-propyl ether, triethylene glycol n-butyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, tripropylene glycol n-propyl ether, and tripropylene glycol n-butyl ether. The alcohol is exemplified, for example, by methyl alcohol, ethyl alcohol, n-propyl alcohol, isopropyl alcohol, n-butyl alcohol, sec-butyl alcohol, isobutyl alcohol, tert-butyl alcohol, and benzyl alcohol. The amide is exemplified, for example, by dimethylformamide and dimethylacetoamide. The ketone is exemplified, for example, by acetone. The ketoalcohol is exemplified, for example, by diacetone alcohol. The ether is exemplified, for example, by tetrahydrofuran and dioxane. The nitrogen-containing solvent is exemplified, for example, by pyrrolidone, 2-pyrrolidone, N-methyl-2-pyrrolidone, cyclohexylpyrrolidone, and triethanolamine. The sulfur-containing solvent is exemplified, for example, by thiodiethanol, thiodiglycol, thiodiglycerol, sulforan, and dimethylsulfoxide. The blending amount of the water-soluble organic solvent with respect to the total amount of the treatment solution is not specifically limited. One type of the water-soluble organic solvent may be used singly, or two or more types of the water-soluble organic solvents may be used in combination.

The treatment solution may contain any colorant. Alternatively, it is also allowable that the treatment solution does not contain any colorant. When the treatment solution contains the colorant, it is preferable that the colorant is contained in an amount of such an extent that the recorded image is not affected thereby.

The treatment solution may further contain a conventionally known additive, if necessary. The additive is exemplified, for example, by surfactant, pH-adjusting agent, viscosity-adjusting agent, surface tension-adjusting agent, antioxidizing agent, and fungicide. The viscosity-adjusting agent is exemplified, for example, by polyvinyl alcohol, cellulose, and water-soluble resin.

The treatment solution can be prepared, for example, by mixing the quaternary alkylammonium salt represented by the general formula (1), water, and optionally other additive components uniformly or homogeneously by any conventionally known method.

The water-based ink for ink-jet recording (hereinafter simply referred to as "water-based ink" or "ink" in some cases), which is usable together with the treatment solution of the present teaching, is not specifically limited. It is possible to use, for example, the water-based ink as explained below in relation to the water-based ink set for ink-jet recording.

Next, an explanation will be made about the water-based ink set for ink-jet recording of the present teaching (hereinafter simply referred to as "water-based ink set" or "ink set" in some cases). The water-based ink set of the present teaching resides in a water-based ink set for ink-jet recording including a water-based ink for ink-jet recording and a treatment solution; wherein the water-based ink is a water-based ink containing a pigment, water, and a water-soluble organic solvent; and the treatment solution is the treatment solution of the present teaching. The water-based ink set of the present teaching, in which the pigment ink and the treatment solution of the present teaching are combined, makes it possible to improve the optical density (OD value) of the recorded image, and the water-based ink set of the present teaching is excellent in the storage stability of the treatment solution as well.

The pigment is exemplified, for example, by carbon black, inorganic pigments, and organic pigments. The carbon black is exemplified, for example, by furnace black, lamp black, acetylene black, and channel black. The inorganic pigment may be exemplified, for example, by titanium oxide, inorganic pigments based on iron oxide, and inorganic pigments based on carbon black. The organic pigment is exemplified, for example, by azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; and aniline black daylight fluorescent pigment. Any other pigment is also usable provided that the pigment is dispersible in the water phase. Specified examples of the pigments as described above include, for example, C. I. Pigment Blacks 1, 6, and 7; C. I. Pigment Yellows 1, 2, 3, 12, 13, 14, 15, 16, 17, 55, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; and C. I. Pigment Greens 7 and 36.

The pigment may be any self-dispersible pigment. The self-dispersible pigment is dispersible in water without using any dispersing agent, for example, owing to the fact that at least one of the hydrophilic functional group and the salt thereof including, for example, carbonyl group, hydroxyl group, carboxylic acid group, sulfonic acid group, and phosphoric acid group is introduced into the pigment particles by the chemical bond directly or with any other group intervening therebetween. Those usable as the self-dispersible pigment include, for example, those in which the pigment is treated or processed in accordance with any method described, for example, in Japanese Patent Application Laid-open No. 8-3498, Japanese Patent Application Laid-open No. 2000-513396 (PCT), Japanese Patent Application Laid-open No. 2008-524400 (PCT), and Japanese Patent Application Laid-open No. 2009-515007 (PCT). As for the raw material for the self-dispersible pigment, it is possible to use any one of inorganic pigments and organic pigments. The pigment, which is suitable to perform the treatment as described above, includes, for example, carbon blacks such as "MA8" and "MA100" produced by Mitsubishi Chemical Corporation and "Color Black FW200" produced by Degussa. For example, any commercially available product may be used for the self-dispersible pigment. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M", and "CAB-O-JET (trade name) 470Y" produced by Cabot Specialty Chemicals; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink Mfg. Co., Ltd.

The blending amount of the solid content of the pigment with respect to the total amount of the water-based ink (pigment solid content amount) is not specifically limited, which can be appropriately determined depending on, for example, the desired optical density and the coloration or colorfulness. The pigment solid content amount is, for example, 0.1% by weight to 20% by weight, preferably 1% by weight to 10% by weight, and more preferably 2% by weight to 8% by weight.

The water-based ink may further contain, for example, a dye as the colorant in addition to the pigment.

It is preferable that the water, which is used for the water-based ink, is ion exchange water or pure water. The blending amount (water ratio) of water with respect to the total amount of the water-based ink is, for example, 10% by weight to 90% by weight and preferably 40% by weight to 80% by weight. The water ratio may be the balance of those of the other components.

The water-soluble organic solvent, which is usable for the water-based ink, includes, for example, humectant (a moistening agent) which prevents the water-based ink from being dried at the nozzle forward end portion of the ink-jet head, and a penetrant (permeating agent) which adjusts the drying speed on the recording medium.

The humectant is not specifically limited, which includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyhydric alcohols such as polyalkylene glycols, alkylene glycols, and glycerol; 2-pyrrolidone; N-methyl-2-pyrrolidone; and 1,3-dimethyl-2-imidazolidinone. The polyalkylene glycol includes, for example, polyethylene glycol and polypropylene glycol. The alkylene glycol includes, for example, ethylene glycol, propylene glycol, butylene glycol, diethylene glycol, triethylene glycol, dipropylene glycol, tripropylene glycol, thiodiglycol, and hexylene glycol. One type of the humectant as described above may be used singly, or two or more types of the humectants as described above may be used in combination. In particular, it is preferable to use polyhydric alcohols such as alkylene glycol and glycerol.

The blending amount of the moistening agent with respect to the total amount of the water-based ink is, for example, 0% by weight to 95% by weight, preferably 5% by weight to 80% by weight, and more preferably 5% by weight to 50% by weight.

The penetrant includes, for example, glycol ether compounds. The glycol ether compound includes, for example, ethylene glycol methyl ether, ethylene glycol ethyl ether, ethylene glycol n-propyl ether, diethylene glycol methyl ether, diethylene glycol ethyl ether, diethylene glycol n-propyl ether, diethylene glycol n-butyl ether, diethylene glycol n-hexyl ether, triethylene glycol methyl ether, triethylene glycol ethyl ether, triethylene glycol n-propyl ether, triethylene glycol n-butyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, tripropylene glycol n-propyl ether, and tripropylene glycol n-butyl ether. One type of the penetrant as described above may be used singly, or two or more types of the penetrants as described above may be used in combination.

The blending amount of the penetrant with respect to the total amount of the water-based ink is, for example, 0% by weight to 20% by weight, preferably 0.1% by weight to 15% by weight, and more preferably 0.5% by weight to 10% by weight.

The water-based ink may further contain conventionally known additives, if necessary. The additive includes, for example, surfactants, pH-adjusting agents, viscosity-adjusting agents, surface tension-adjusting agents, and fungicides. The viscosity-adjusting agent includes, for example, polyvinyl alcohol, cellulose, and water-soluble resin.

The water-based ink can be prepared, for example, such that the pigment, water, the water-soluble organic solvent, and optionally other additive components are mixed uniformly or homogeneously by any conventionally known method, and undissolved matters are removed by a filter or the like.

In another viewpoint, the water-based ink set for ink-jet recording can be also provided as an ink cartridge. For example, an ink cartridge of the present teaching has an ink accommodating section and a treatment solution accommodating section, wherein the water-based ink of the present teaching is accommodated in the ink accommodating section, and the treatment solution of the present teaching is accommodated in the treatment solution accommodating section.

The ink cartridge of the present teaching may have an accommodating section for accommodating any water-based ink other than the water-based ink of the present teaching.

The ink cartridge of the present teaching may be an ink cartridge assembly wherein the water-based ink cartridge and the treatment solution cartridge, which are formed distinctly and independently, are assembled. Alternatively, the ink cartridge of the present teaching may be an integrated type ink cartridge which is partitioned in its interior so that the ink accommodating section and the treatment solution accommodating section are formed. For example, a conventionally known main body can be used as the main body of the ink cartridge of the present teaching.

Next, an explanation will be made about an ink-jet recording method and an ink-jet recording apparatus according to the present teaching.

The ink-jet recording method according to the present teaching resides in an ink-jet recording method for performing recording by using a water-based ink set for ink-jet recording including a treatment solution and a water-based ink for ink-jet recording; the ink-jet recording method including a step of applying the treatment solution to a recording medium; and a recording step of discharging the water-based ink onto the recording medium in accordance with an ink-jet recording system to perform the recording; wherein the water-based ink set for ink-jet recording of the present teaching is used as the water-based ink set.

The ink-jet recording apparatus according to the present teaching resides in an ink-jet recording apparatus including an ink set accommodating section, a treatment solution applying mechanism, and an ink discharge mechanism; wherein the water-based ink set for ink-jet recording of the present teaching is accommodated in the ink set accommodating section; the treatment solution, which constitutes the water-based ink set, is applied to a recording medium by the treatment solution applying mechanism; and the water-based ink, which constitutes the water-based ink set, is discharged to the recording medium by the ink discharge mechanism.

The ink-jet recording method of the present teaching can be carried out, for example, by using the ink-jet recording apparatus of the present teaching. The recording includes, for example, the printing of letters, the printing of images, and the printing.

An ink-jet recording apparatus 1 shown in FIG. 1 includes, as main constitutive elements, an ink cartridge assembly 2, an ink discharge mechanism (ink-jet head) 3, a head unit 4, a carriage 5, a driving unit 6, a platen roller 7, and a purge unit 8.

The ink cartridge assembly 2 includes a treatment solution cartridge 2a, and four water-based ink cartridges 2b. The treatment solution cartridge 2a contains the treatment solution of the present teaching. Each of the four water-based ink cartridges 2b contains each one color of the four color water-based inks of yellow, magenta, cyan, and black. At least one of the four color water-based inks contains the pigment as the colorant.

The ink-jet head 3, which is installed in the head unit 4, performs the recording on the recording medium (for example, recording paper) P. The ink cartridge assembly 2 and the head unit 4 are carried on the carriage 5. The driving unit 6 reciprocatively moves the carriage 5 in the straight line direction. For example, any conventionally known unit (see, for example, Japanese Patent Application Laid-open No. 2008-246821) can be used as the driving unit 6. The platen roller 7 extends in the reciprocating direction of the carriage 5, and the platen roller 7 is arranged opposingly to the ink-jet head 3.

The recording paper P is fed from a paper feed cassette (not shown) which is provided at a side portion or a lower portion of the ink-jet recording apparatus 1. The recording paper P is introduced into the space between the ink-jet head 3 and the platen roller 7. The treatment solution is applied (discharged) from the ink-jet head 3 to the introduced recording paper P.

The purge unit 8 sucks any defective ink containing, for example, the bubble allowed to stay in the ink-jet head 3. For example, any conventionally known unit (see, for example, Japanese Patent Application Laid-open No. 2008-246821) can be used as the purge unit 8.

A wiper member 20 is arranged adjacently to the purge unit 8 at the position disposed on the side of the platen roller 7 in relation to the purge unit 8. The wiper member 20 is formed to have a spatula-shaped form. The wiper member 20 wipes out the nozzle-formed surface of the ink-jet head 3 in accordance with the movement of the carriage 5. With reference to FIG. 1, a cap 18 is provided to cover the plurality of nozzles of the ink-jet head 3 which is returned to the reset position when the recording is completed, in order to prevent the treatment solution and the water-based inks from being dried.

The ink cartridge assembly 2 is carried on one carriage 5 together with the head unit 4 in the ink-jet recording apparatus 1 of this embodiment. However, the present teaching is not limited thereto. The respective cartridges of the ink cartridge assembly 2 may be carried on any carriage distinct from that for the head unit 4, in the ink-jet recording apparatus. Further, the respective cartridges of the ink cartridge assembly 2 may be arranged and fixed in the ink-jet recording apparatus, without being carried on the carriage 5. In the embodiments as described above, for example, the respective cartridges of the ink cartridge assembly 2 are connected to the head unit 4 carried on the carriage 5 via tubes or the like. The treatment solution and the water-based inks are supplied from the respective cartridges of the ink cartridge assembly 2 to the head unit 4.

Figure 2A:
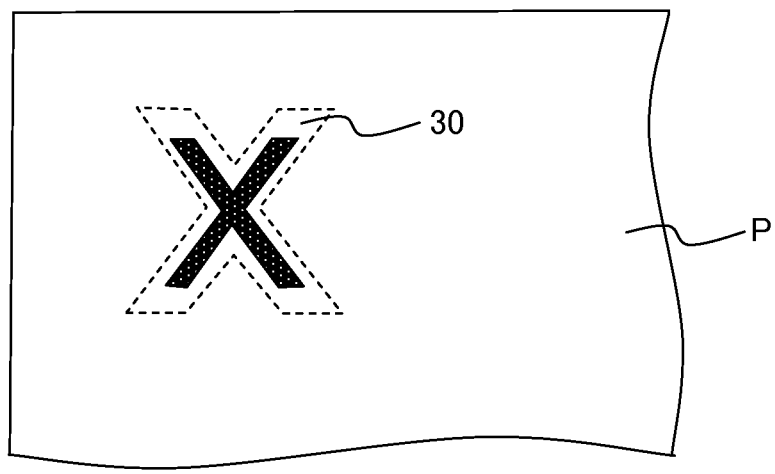
FIGS. 2A and 2B show examples of the recording performed by an ink-jet recording method according to the present teaching.
Figure 2B:
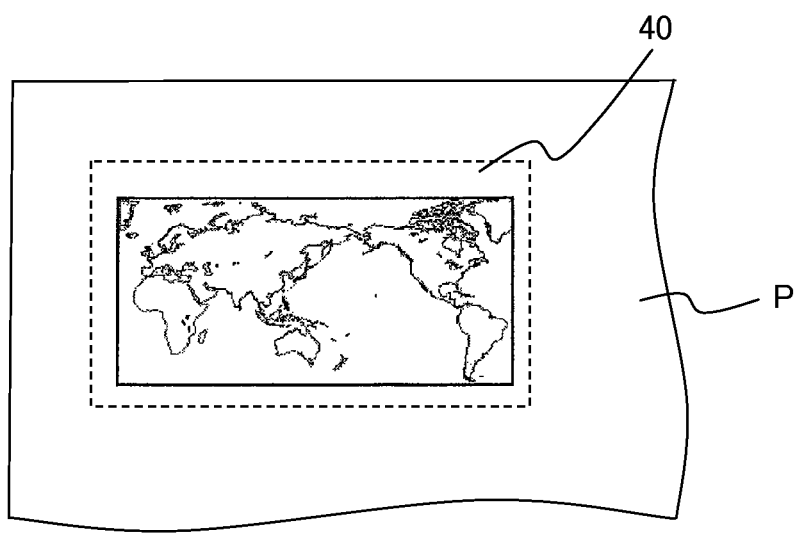

The ink-jet recording, which uses the ink-jet recording apparatus 1 described above, is carried out, for example, as follows. At first, the treatment solution of the present teaching is applied or coated (discharged) to the recording paper P from the ink-jet head 3. The treatment solution may be applied to either an entire surface or a part of the recording surface of the recording paper P. When the treatment solution is applied to the part of the recording surface, the application portion is the recording portion of the recording surface of the recording paper P at least subjected to the recording with the water-based ink. When the treatment solution is applied to the part, it is appropriate that the size of the application portion is larger than the recording portion. For example, as shown in FIG. 2A, when a letter (X) is recorded on the recording paper P, it is preferable that the treatment solution is applied so that an impartation portion 30 is formed with a line width larger than the line width of the letter. On the other hand, as shown in FIG. 2B, when a pattern is recorded on the recording paper P, it is preferable that the treatment solution is applied so that an application portion 40, which is larger than the pattern, is formed.

Subsequently, the water-based ink is discharged from the ink-jet head 3 to the application portion of the treatment solution of the recording paper P. The time, which elapses from the discharge of the treatment solution to the discharge of the water-based ink, is not specifically limited. For example, the discharge of the water-based ink may be carried out within the same scanning together with the discharge of the treatment solution. The treatment solution and the water-based ink are brought in contact with each other on the recording paper P, and thus the optical density (OD value) of the recorded image is improved.

In the ink-jet recording apparatus 1 of this embodiment, the ink discharge mechanism also serves as the treatment solution applying mechanism. However, the present teaching is not limited thereto. In the present teaching, the application of the treatment solution may be carried out in accordance with any system including, for example, the stamp application, the brush application, and the roller application. The treatment solution of the present teaching can be applied in accordance with any system including, for example, the ink discharge mechanism, the stamp application, the brush application, and the roller application, because the treatment solution of the present teaching is excellent in the storage stability.

As in this embodiment, it is preferable that the water-based ink is discharged after applying the treatment solution to the recording paper P beforehand. Accordingly, for example, it is possible to enhance the aggregation efficiency of the pigment contained in the water-based ink. However, the present teaching is not limited thereto. In the present teaching, the treatment solution may be applied after discharging the water-based ink to the recording paper P beforehand. Alternatively, the application of the treatment solution to the recording paper P and the discharge of the water-based ink may be performed simultaneously.

The recording paper P, which has been subjected to the recording as described above, is discharged from the ink-jet recording apparatus 1. In FIG. 1, the paper feed mechanism and the paper discharge mechanism for the recording paper P are omitted from the illustration.

In the case of the apparatus shown in FIG. 1, the serial type ink-jet head is adopted. However, the present teaching is not limited thereto. The ink-jet recording apparatus may be an apparatus which adopts a line type ink-jet head.

Next, an explanation will be made about a line type ink-jet recording apparatus shown in FIG. 3 as another example of the ink-jet recording apparatus according to the present teaching. The line type ink-jet recording apparatus is an ink-jet recording apparatus which uses a line type ink-jet head having a recording width of not less than the width of the recording medium and which is capable of collectively performing the recording in the widthwise direction of the recording medium in a state in which the ink-jet head is fixed. On the contrary, in the case of the serial type ink-jet recording apparatus having been previously explained, the recording is performed while moving the ink-jet head itself in the widthwise direction of the recording surface of the recording medium. The line type ink-jet recording apparatus has the recording speed which is extremely faster than that of the serial type ink-jet recording apparatus described above.

The ink-jet recording apparatus 100 of this embodiment includes, as main constitutive elements, a treatment solution cartridge 201, a treatment solution coating mechanism (coating roller) 202, four ink cartridges 101, four ink discharge mechanisms (line type ink-jet heads) 102, a paper feed unit 111, a paper discharge unit 112, a belt transport mechanism 113, and a control unit 116 which controls the entire ink-jet recording apparatus 100. The paper feed unit 111 is arranged on one side (left side in FIG. 3) of the belt transport mechanism 113. The paper discharge unit 112 is arranged on the other side (right side in FIG. 3) of the belt transport mechanism 113.

A recording paper transport route, in which the recording medium (for example, the recording paper) P is transported from the paper feed unit 111 toward the paper discharge unit 112 by the aid of the belt transport mechanism 113, is formed in the ink-jet recording apparatus 100. The direction, in which the recording paper P is transported, is designated as the recording paper transport direction X. The paper feed unit 111 includes a recording paper stocker 111*a* and a pickup roller 111*c*. The recording paper stocker 111*a* accommodates the sheets of the recording paper P therein in a stacked state, which has an opening formed at the upper surface thereof. The recording paper stocker 111*a* is arranged in a state of being inclined toward the downstream side in the recording paper transport direction X (right side in FIG. 3, hereinafter simply referred to as "downstream side"). A support plate 111*b*, which is urged by a spring 111*d* in the direction directed from the bottom surface toward the upper opening, is arranged in the recording paper stocker 111*a*. The recording paper P is stacked on the support plate 111*b*. The pickup roller 111*c* is driven by a placement motor (not shown). Accordingly, the sheets of the recording paper P, which are stacked in the recording paper stocker 111*a*, are picked up (taken out) one by one from the top, and the picked up recording paper P is fed to the downstream side. A recording paper detection sensor 159 is arranged just downstream from the paper feed unit 111. The recording paper detection sensor 159 detects whether or not the fed recording paper P arrives at the recording waiting position A positioned just upstream (on the left side in FIG. 3) in the recording paper transport direction X from the belt transport mechanism 113. The fed recording paper P passes through the recording waiting position A, and the recording paper P is transported to the belt transport mechanism 113.

The belt transport mechanism 113 includes two belt rollers 106, 107, a transport belt 108, a platen 115, and a transport motor (not shown). The transport belt 108 is an endless belt which is wound around so that the transport belt 108 is applied between the two belt rollers 106, 107. The outer surface of the transport belt 108 is designated as an outer circumferential surface 108*a*. The platen 115 is arranged at the position opposed to an coating roller 202 and the four line type ink-jet heads 102 as described later on in the area surrounded by the transport belt 108. The platen 115 supports the transport belt 108 so that the transport belt 108 is not flexibly bent downwardly in the area opposed to the coating roller 202 and the four line type ink-jet heads 102. A nip roller 104 is arranged at the position opposed to the belt roller 107. The nip roller 104 presses the recording paper P against the outer circumferential surface 108*a* when the recording paper P, which is transported to the belt transport mechanism 113, is placed on the outer circumferential surface 108*a*. When the transport motor rotates the belt roller 106, the transport belt 108 is driven (rotated). Accordingly, the transport belt 108 transports the pressed recording paper P toward the paper discharge unit 112, while adhesively holding the pressed recording paper P. An exfoliating mechanism 114 is provided just downstream from the transport belt 108. The exfoliating mechanism 114 is constructed such that the recording paper P, which is adhesively stuck to the outer circumferential surface 108*a*, is exfoliated from the outer circumferential surface 108, and the recording paper P is fed toward the paper discharge unit 112.

The ink set for the ink-jet recording apparatus 100 is formed with four water-based ink cartridges 101 and a treatment solution cartridge 201 which are formed distinctly and independently. A supply tube 201*a*, which supplies the treatment solution to the coating roller 202, extends from the treatment solution cartridge 201. The treatment solution is supplied to the coating roller 202 via the supply tube 201*a*. The four ink cartridges 101 have the line type ink-jet heads 102 at the lower ends thereof respectively. Each of the four ink cartridges 101 includes each one color of four color water-based inks of yellow, magenta, cyan, and black. At least one of the four color water-based inks contains the pigment as the colorant.

The four ink cartridges 101 and the coating roller 202 are fixed while being aligned over the belt transport mechanism 113 in the recording paper transport direction X. The coating roller 202 is arranged on the upstream side as compared with the four ink cartridges 101 in the recording paper transport direction X.

The ink-jet recording, which uses the ink-jet recording apparatus 100, is carried out, for example, as follows. At first, when the recording paper P, which is transported by the transport belt 108, passes just under the coating roller 202, then the coating roller 202 is brought in contact with the recording paper P, and the coating roller 202 is rotated. The treatment solution, which is supplied from the treatment solution cartridge 201, is coated by the coating roller 202 to the upper surface of the recording paper P, while rotating the coating roller 202. Subsequently, the recording paper P, to which the treatment solution has been coated, passes under the line type ink-jet heads 102. When the recording paper P passes just under the four line type ink-jet heads 102, the water-based inks are discharged to the application portion of the treatment solution of the recording paper P. The treatment solution and the water-based ink are brought in contact each other on the recording paper P, and thus the optical density (OD value) of the recorded image is improved.

Figure 3:
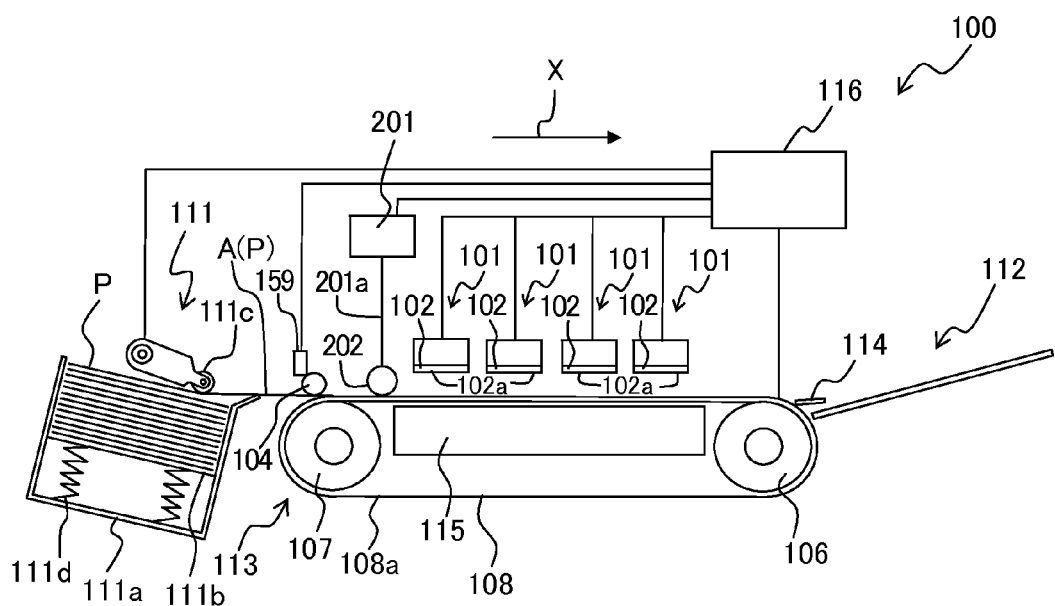
FIG. 3 shows a schematic cross-sectional view illustrating an exemplary arrangement of an ink-jet recording apparatus according to the present teaching (a line type ink-jet head is adopted).

Each of the ink-jet recording apparatus 1 shown in FIG. 1 and the ink-jet recording apparatus 100 shown in FIG. 3 may include a metal member which is brought in contact with the treatment solution. In the treatment solution of the present teaching, the anion $X^-$ of the quaternary alkylammonium salt represented by the general formula (1) is at least one of the inorganic acid ion, the organic acid ion, and the hydroxide ion, and no halide ion is contained. Therefore, the treatment solution of the present teaching hardly corrodes the metal member. Examples of the metal member may include, for example, a flow passage for the treatment solution inside the ink-jet head 3, or a flow passage inside the ink cartridge assembly 2 in the ink-jet recording apparatus 1 shown in FIG. 1, or the coating roller 202 in the ink-jet recording apparatus 100 shown in FIG. 3, etc. The material of the metal member may include, for example, a nickel-containing ally (nickel alloy) such as 42 alloy, invar, permalloy, etc.

EXAMPLES

Next, Examples of the present teaching will be explained together with Comparative Examples. It is noted that the present teaching is not limited and restricted to Examples and Comparative Examples described below.

Preparation of Treatment Solution

Respective components of treatment solution compositions (Tables 2 and 3) were mixed uniformly or homogeneously to obtain Treatment solutions 1 to 26.

Preparation of Water-Based Ink

An ink solvent was obtained by uniformly mixing components except for a dispersion of self-dispersible carbon black in water in relation to a water-based ink composition (Table 1). Subsequently, the ink solvent was added to the water dispersion of the self-dispersible carbon black, followed by being mixed uniformly. After that, an obtained mixture was filtrated through a cellulose acetate type membrane filter (pore size: 3.00 μm) produced by Toyo Roshi Kaisha, Ltd. Thus, a water-based ink for ink-jet recording was obtained.

TABLE 1

| | |
|---|---|
| CAB-O-JET (trade name) 300 (*1) | 26.7 (4.0) |
| Glycerol | 20.0 |
| Diethylene glycol | 4.0 |
| Dipropylene glycol n-propyl ether | 2.0 |
| Sodium polyoxyethylene lauryl ether sulfate (*2) | 1.0 |
| Water | balance |

(*1): Water dispersion of self-dispersible carbon black, produced by Cabot, carbon black concentration = 15% by weight, parenthesized numeral indicates pigment solid content amount.
(*2): Oxyethylene average polymerization degree = 12.
Unit of blending amount is % by weight.

Examples 1 and 2 and Comparative Examples 1 to 4

Treatment solutions 1 to 26 described above were used in combination with the water-based ink for ink-jet recording, and (a) the optical density (OD value) of the recorded image was evaluated in accordance with the following method. Further, (b) the separation after the thawing of the treatment solution was evaluated in accordance with the following method.

(a) Evaluation of Optical Density (OD Value) of Recorded Image

The treatment solution of each of Examples and Comparative Examples was spread uniformly on regular paper (My Paper produced by Ricoh Company, Ltd.) by using a bar coater (rod No. 8 of the bar coater produced by Yasuda Seiki Seisakusho LTD.).

Subsequently, a digital multifunction machine DCP-330C produced by Brother Industries, Ltd., which carried an ink-jet printer, was used to prepare an evaluation sample by recording a black single color patch at a resolution of 600 dpi×600 dpi on the regular paper by using the water-based ink for ink-jet recording described above. The optical density (OD value) of the evaluation sample was measured by using a spectrophotometer Spectrolino produced by Gretag Macbeth (light source: $D_{50}$, field angle: 2°, filter: Status T), and the evaluation was made in accordance with the following evaluation criterion. The measurement result of the optical density (OD value) is the average value of those obtained by performing the measurement five times.

(b) Evaluation of Separation after Thawing

The treatment solution was frozen and stored at −20° C., and then the treatment solution was thawed at the ordinary temperature. The separation after the thawing was evaluated in accordance with the following evaluation criterion.

Evaluation Criterion for Evaluation of Separation after Thawing

G: The phase separation was not observed in the treatment solution.

NG: The phase separation was observed in the treatment solution.

The compositions and the evaluation results of the treatment solutions of Examples 1 and 2 and Comparative Examples 1 to 4 are shown in Tables 2 and 3. In Table 2, a result of (a) evaluation of the optical density (OD value) of the recorded image, which was obtained with only the water-based ink for ink-jet recording without applying the treatment solution to the regular paper, is shown as a "Reference".

TABLE 2

| | | Example 1 | | | | | | Example 2 | |
|---|---|---|---|---|---|---|---|---|---|
| Treatment solution | | 1 | 2 | 3 | 4 | 5 | 6 | 7 | 8 |
| Composition of treatment solution (% by weight) | Quaternary alkylammonium salt (*1) | 1.0 | 4.0 | 7.5 | 10.0 | 15.0 | 20.0 | — | — |
| | Quaternary alkylammonium salt (*2) | — | — | — | — | — | — | 1.0 | 4.0 |
| | Dipropylene glycol n-propyl ether | 1.0 | 1.0 | 1.0 | 1.0 | 1.0 | 1.0 | 1.0 | 1.0 |
| | Diethylene glycol | 10.0 | 10.0 | 10.0 | 10.0 | 10.0 | 10.0 | 10.0 | 10.0 |
| | Water | balance | balance | balance | balance | balance | balance | balance | balance |
| Evaluation of optical density (OD value) of recorded image | | 1.24 | 1.27 | 1.29 | 1.30 | 1.31 | 1.31 | 1.26 | 1.30 |
| Evaluation of separation after thawing | | G | G | G | G | G | G | G | G |

| | | Example 2 | | | | Reference |
|---|---|---|---|---|---|---|
| Treatment solution | | 9 | 10 | 11 | 12 | none |
| Composition of treatment solution (% by weight) | Quaternary alkylammonium salt (*1) | — | — | — | — | — |
| | Quaternary alkylammonium salt (*2) | 7.5 | 10.0 | 15.0 | 20.0 | — |
| | Dipropylene glycol n-propyl ether | 1.0 | 1.0 | 1.0 | 1.0 | — |
| | Diethylene glycol | 10.0 | 10.0 | 10.0 | 10.0 | — |
| | Water | balance | balance | balance | balance | — |
| Evaluation of optical density (OD value) of recorded image | | 1.37 | 1.41 | 1.43 | 1.44 | 1.19 |
| Evaluation of separation after thawing | | G | G | G | G | — |

*(1): Quaternary alkylammonium salt (active ingredient amount) in which $R^1$ and $R^2$ are methyl groups respectively, $R^3$ is ethyl group, $R^4$ is octyl group, and $X^-$ is ethyl sulfate ion in the general formula (1).
*(2): Quaternary alkylammonium salt (active ingredient amount) in which $R^1$ and $R^2$ are methyl groups respectively, $R^3$ is ethyl group, $R^4$ is lauryl group, and $X^-$ is ethyl sulfate ion in the general formula (1).

TABLE 3

| | Treatment solution | Comparative Example 1 | | | | | | Comparative Example 2 | |
|---|---|---|---|---|---|---|---|---|---|
| | | 13 | 14 | 15 | 16 | 17 | 18 | 19 | 20 |
| Composition of treatment solution (% by weight) | Quaternary alkylammonium salt (*5) | 1.0 | 4.0 | 7.5 | 10.0 | 15.0 | 20.0 | — | — |
| | Quaternary alkylammonium salt (*6) | — | — | — | — | — | — | 1.0 | 4.0 |
| | Quaternary alkylammonium salt (*7) | — | — | — | — | — | — | — | — |
| | Polyallylamine (*8) | — | — | — | — | — | — | — | — |
| | Dipropylene glycol n-propyl ether | 1.0 | 1.0 | 1.0 | 1.0 | 1.0 | 1.0 | 1.0 | 1.0 |
| | Diethylene glycol | 10.0 | 10.0 | 10.0 | 10.0 | 10.0 | 10.0 | 10.0 | 10.0 |
| | Water | balance | balance | balance | balance | balance | balance | balance | balance |
| Evaluation of optical density (OD value) of recorded image | | 1.19 | 1.19 | 1.20 | 1.21 | 1.23 | 1.23 | 1.26 | 1.30 |
| Evaluation of separation after thawing | | G | G | G | G | G | G | NG | NG |

| | Treatment solution | Comparative Example 2 | | | | Comparative Example 3 | Comparative Example 4 |
|---|---|---|---|---|---|---|---|
| | | 21 | 22 | 23 | 24 | 25 | 26 |
| Composition of treatment solution (% by weight) | Quaternary alkylammonium salt (*5) | — | — | — | — | — | — |
| | Quaternary alkylammonium salt (*6) | 7.5 | 10.0 | 15.0 | 20.0 | — | — |
| | Quaternary alkylammonium salt (*7) | — | — | — | — | 4.0 | — |
| | Polyallylamine (*8) | — | — | — | — | — | 3.0 |
| | Dipropylene glycol n-propyl ether | 1.0 | 1.0 | 1.0 | 1.0 | 1.0 | 1.0 |
| | Diethylene glycol | 10.0 | 10.0 | 10.0 | 10.0 | 10.0 | 10.0 |
| | Water | balance | balance | balance | balance | balance | balance |
| Evaluation of optical density (OD value) of recorded image | | 1.37 | 1.42 | 1.45 | 1.46 | 1.30 | 1.30 |
| Evaluation of separation after thawing | | NG | NG | NG | NG | NG | NG |

*(5): Quaternary alkylammonium salt (active ingredient amount) in which $R^1$ to $R^4$ are methyl groups respectively, and $X^-$ is chloride ion in the general formula (1).
*(6): Quaternary alkylammonium salt (active ingredient amount) in which $R^1$ to $R^3$ are methyl groups respectively, $R^4$ is stearyl group, and $X^-$ is chloride ion in the general formula (1).
*(7): Quaternary alkylammonium salt (active ingredient amount) in which $R^1$ to $R^3$ are methyl groups respectively, $R^4$ is stearyl group, and $X^-$ is ethyl sulfate ion in the general formula (1).
*(8): Neutralized product with hydrogen chloride.

As shown in Table 2, it was observed that the optical density (OD value) of the recorded image was improved, and the result of the evaluation of the separation after thawing was satisfactory as well in Examples 1 and 2 as compared with the Reference.

On the other hand, as shown in Table 3, the optical density (OD value) of the recorded image was approximately at the same degree as that of the Reference in Comparative Example 1 wherein the quaternary alkylammonium salt, in which $R^4$ was the methyl group having the number of carbon atom of 1 in the general formula (1), was used for the treatment solution. According to the comparison between Examples 1 and 2 and Comparative Example 1, it has been revealed that the optical density (OD value) of the recorded image is improved when the alkyl group of $R^4$ has the number of carbon atoms of not less than 8.

Further, the result of the evaluation of the separation after thawing was inferior in Comparative Examples 2 and 3 wherein the quaternary alkylammonium salt, in which $R^4$ was the stearyl group having the number of carbon atoms of 18 in the general formula (1), was used. According to the comparison between Examples 1 and 2 and Comparative Examples 2 and 3, it has been revealed that the storage stability is improved in the low temperature environment when the alkyl group has the number of carbon atoms of not more than 16.

Further, the result of the evaluation of the separation after thawing was inferior in Comparative Example 4 wherein polyallylamine was blended to the treatment solution in place of the quaternary alkylammonium salt. The color-change was not observed even when the treatment solutions were stored in a high temperature environment in the case of Examples 1 and 2. On the contrary, the color of the treatment solution was changed when the treatment solution was stored in a high temperature environment in the case of Comparative Example 4. According to the comparison between Examples 1 and 2 and Comparative Example 4, it has been revealed that the storage stability is improved in the low temperature environment and the high temperature environment when the quaternary alkylammonium salt of the present teaching is used for the treatment solution.

As described above, the treatment solution for ink-jet recording of the present teaching makes it possible to improve the optical density (OD value) of the recorded image, and the treatment solution for ink-jet recording of the present teaching is excellent in the storage stability as well. The way of use of the treatment solution of the present teaching is not specifically limited. The treatment solution of the present teaching is widely applicable to various types of ink-jet recording.

What is claimed is:

1. A treatment solution used for ink-jet recording, comprising:
a quaternary alkylammonium salt represented by general formula (I) and water:

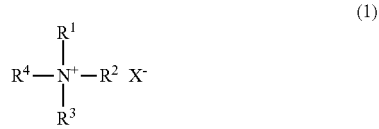

wherein $R^1$ to $R^3$ are alkyl groups each having 1 to 3 carbon atoms, and are identical with each other or different from each other;
$R^4$ is an alkyl group having 8 to 16 carbon atoms;
each of the alkyl groups of $R^1$ to $R^4$ is an unsubstituted alkyl group, and has a straight chain or a branched chain; and
$X^-$ is one of inorganic acid ion, organic acid ion, and hydroxide ion.

2. The treatment solution according to claim 1, wherein $R^1$ to $R^3$ are alkyl groups each having 1 or 2 carbon atoms; and $R^4$ is an alkyl group having 8 to 12 carbon atoms.

3. The treatment solution according to claim 1, wherein the quaternary alkylammonium salt represented by the general formula (1) is contained at not less than 1% by weight in the treatment solution.

4. The treatment solution according to claim 1, wherein the treatment solution does not contain any colorant.

5. The treatment solution according to claim 1, wherein $R^1$ and $R^2$ are methyl groups, $R^3$ is a methyl group or ethyl group and $R^4$ is an octyl group or lauryl group.

6. A water-based ink set for ink-jet recording comprising:
a water-based ink for ink-jet recording which contains a pigment, water, and a water-soluble organic solvent; and
the treatment solution as defined in claim 1.

7. The ink set according to claim 6, wherein the treatment solution does not contain any colorant.

8. An ink-jet recording method for performing recording on a recording medium, the method comprising:
applying, to the recording medium, the treatment solution of the water-based ink set for ink-jet recording as defined in claim 6; and
discharging, to the recording medium, the water-based ink of the water-based ink set for ink-jet recording.

9. The ink-jet recording method according to claim 8, wherein the water-based ink is discharged to the recording medium after the treatment solution has been applied to the recording medium.

10. An ink-jet recording apparatus comprising:
an ink set accommodating section in which the water-based ink set for ink-jet recording as defined in claim 6 is accommodated;
a treatment solution applying mechanism which applies, to the recording medium, the treatment solution of the water-based ink set; and
an ink discharge mechanism which discharges, to the recording medium, the water-based ink of the water-based ink set.

11. The ink-jet recording apparatus according to claim 10, wherein the treatment solution applying mechanism is a treatment solution discharge mechanism which discharges the treatment solution to the recording medium or a treatment solution coating mechanism which coats the treatment solution to the recording medium.

12. The ink-jet recording apparatus according to claim 10, further comprising a metal member which is brought in contact with the treatment solution.

13. The ink-jet recording apparatus according to claim 12, wherein the treatment solution applying mechanism includes the metal member which is brought in contact with the treatment solution.

14. The ink-jet recording apparatus according to claim 12, wherein the metal member includes a nickel alloy.

15. An ink cartridge containing the treatment solution used for an ink-jet recording as defined in claim 1.

* * * * *